Jan. 31, 1967  W. STEUERNAGEL  3,300,850
FASTENING MEANS AND METHOD OF FASTENING
ELECTROSTATIC FILTER PLATES
Filed April 9, 1962  2 Sheets-Sheet 1
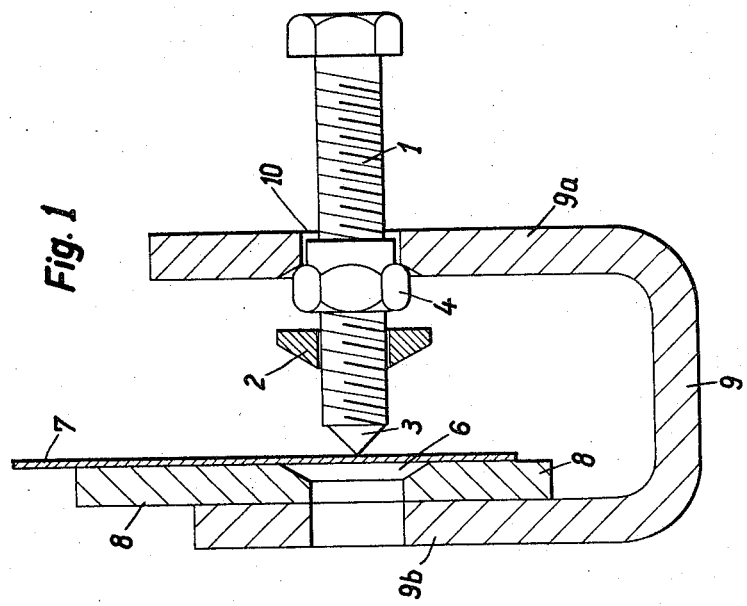
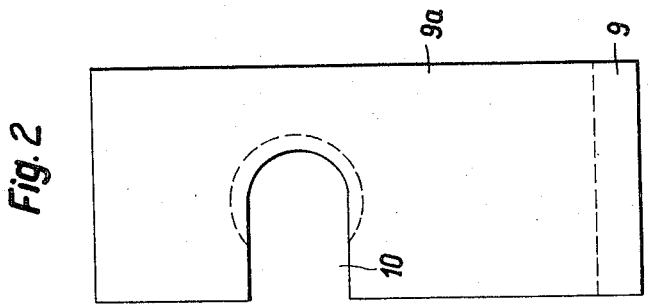
Inventor:
Walter Steuernagel
BY Bailey, Stephens & Huettig
ATTORNEYS

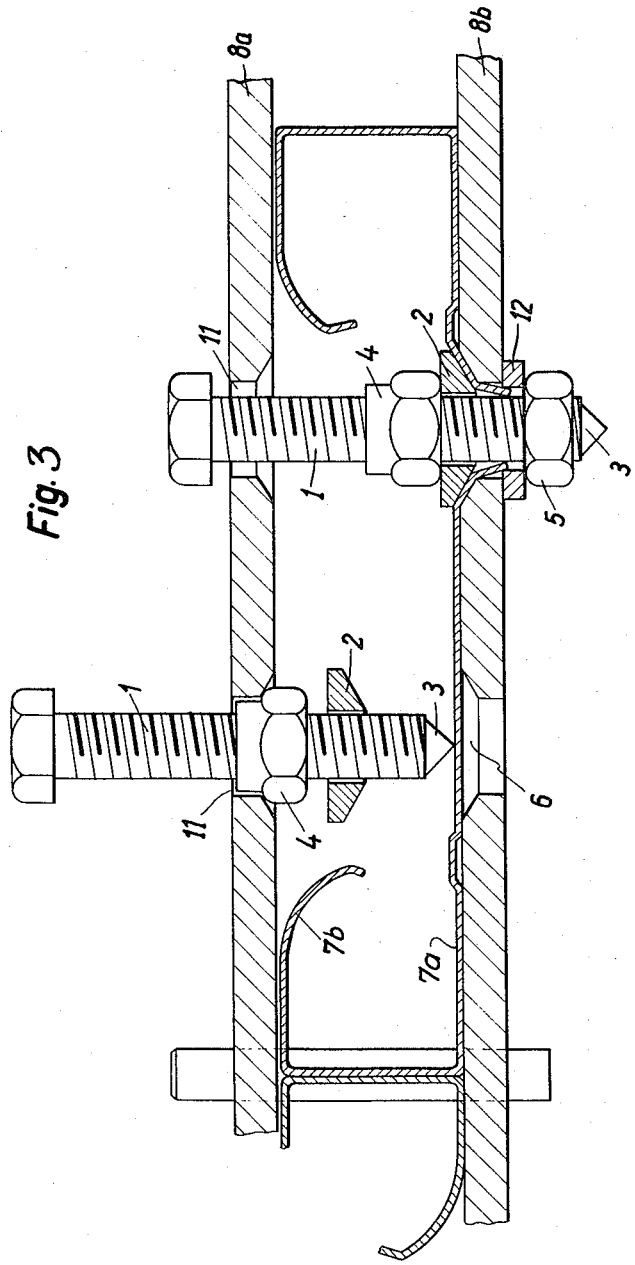

United States Patent Office 3,300,850
Patented Jan. 31, 1967

3,300,850
FASTENING MEANS AND METHOD OF FASTENING ELECTROSTATIC FILTER PLATES
Walter Steuernagel, Frankfurt am Main, Germany, assignor to Metallgesellschaft Aktiengesellschaft, Frankfurt am Main, Germany
Filed Apr. 9, 1962, Ser. No. 186,112
Claims priority, application Germany, May 6, 1961, M 48,974
8 Claims. (Cl. 29—432.1)

This invention relates to electrostatic filters and, more particularly, to the means for fastening thin electrostatic filter plates to a frame-like suspension construction and/or a rapping or knocking beam.

Before being installed in a filter, the electrostatic precipitating metal plates are bored to form bore holes so that they can be fastened to the suspension construction frame or rapping or knocking beams by bolts and nuts at the place of installation. In actual practice, it has been found that the pre-forming of exactly positioned bore holes in very thin metal plates, such as those having a thickness less than 2.0 mm., is useless because the sagging of the carrying frame requires electrode plates of varying lengths. One attempt to overcome this difficulty has been to bore bolt holes which are larger than the bolts in order to compensate for the sagging produced during erection and then by wear and tear. Even though the electrode plates are secured to the bolts with washers and lock washers, such fastenings do not remain tight and stable because of the continuous knocking of the precipitating plates to shake the dust therefrom. The bolts become loose and the electrode plates are therefore only loosely connected to the knocking means. Such loose connections fail to transfer a substantial portion of the energy from the knocking beams to the metal electrode plates, and consequently, the electrode plates are not effectively cleaned of dust.

The object of this invention is to produce a means for tightly securing the metal electrode plates to the carrying frame or beam and the knocking beam at the place of installation and thus avoid the pre-forming of bolt holes.

In general, these and other objects of the invention are obtained by forming the bolts so that, when they are tightened against the metal electrode plate in alignment with pre-formed holes in the carrying and/or the knocking beam, they pierce the electrode plate to form a bolt hole therethrough and, upon further tightening, they force the peripheral edge of the opening in the electrode plate into the bolt hole in the carrying or knocking beam. Upon further tightening, the peripheral edge of the opening in the electrode plate is forced into tight engagement with the bolt hole in the carrying frame or knocking beam, thus causing the electrode plate to be tightly secured to the carrying frame or knocking beam. The fastening device, when used to fasten a plate to flat rods, shafts or beams, is composed of a threaded bolt, preferably made from tempered steel, which has a sharp piercing point and a conical disc slid or threaded onto the shank of the bolt to form a seat. A U-shaped member resembling a clamp and having aligned openings through the legs thereof is placed with one leg against the shaft, rod or knocking beam and the other leg facing the electrode plate lying against the said supporting or knocking beam. The bolt is placed through the opening in the leg facing the electrode plate and a nut is threaded on the shank of the bolt between this leg and the electrode plate so that this leg is used as a bearing surface for forcing the bolt against the electrode plate. The pre-formed bore or bolt hole in the shaft or knocking beam is countersunk so as to receive the peripheral edge of the hole punched through the electrode plate as it is forced into the countersunk depression by the conical disc.

For the fastening of precipitating metal plate electrodes which are provided with collecting pockets along their longitudinal edges, said plates being joined in pairs, a U-shaped knocking beam is used between the legs of which are held the end edges of the electrode plates. Aligned bolt holes extend between the legs. One leg can then function as the bearing surface for driving the bolt through the electrode plate and the aligned bolt hole in the other leg. The diameter of the pre-formed bolt holes in the knocking beam is, in this case, approximately 4 to 6 mm. greater than the diameter of the threaded bolts. This is so that, when the bolts pierce the metal electrodes, they punch holes in the electrode plate of a diameter not greater than that of the bolt, but at the same time, permit the peripheral edge of the punched hole to enter into the pre-formed bolt hole in the knocking beam leg without damaging the threads on the bolts.

The means by which the objects of the invention are obtained are described more fully with reference to the accompanying drawings, in which:

FIGURE 1 is a cross-sectional view through the fastening means of this invention;

FIGURE 2 is a front view of the fastening clamp used in FIGURE 1; and

FIGURE 3 is a horizontal cross-sectional view through a modified form of the invention in which one bolt is shown before puncturing the electrode plate and a second bolt is shown in fully fastened position.

As shown in FIGURES 1 and 3, the threaded fastening bolt 1 is provided with a conically shaped disc 2 which is either freely slidable or threaded upon the shank of bolt 1. The pointed end 3 of bolt 1 preferably is sharpened and hardened. A nut 4 is threaded on bolt 1 between disc 2 and the head of the bolt. The conically shaped surface of disc 2 is adapted to enter the countersunk depression 6 formed in a shaft and/or knocking beam. As shown in FIGURE 1, the metal electrode plate 7 bears against a shaft, supporting or knocking beam 8. The U-shaped clamp 9 has one leg 9a provided with a slot 10 through which extends the shank of bolt 1. An aligned bolt hole is contained in the other leg 9b which bears against supporting means or knocking beam 8. By turning nut 4, the bolt 1 is pressed against metal plate 7 so that the pointed end 3 pierces plate 7 and penetrates through the aligned opening in leg 9b. A nut is then placed on the end of bolt 1, and the nut 4 turned down to force disc 2 into the depression 6 which causes the peripheral edge of the punched opening in plate 7 to be drawn into the depression 6 and tightly held therein. Clamp 9 can then be removed by sliding it so that the clamp is withdrawn from the bolts through slots 10. The nuts on bolt 1 are then finally tightened.

As shown in FIGURE 3, the U-shaped clamp 9 of FIGURE 1 is replaced by a U-shaped or two parallel shafts, rods or knocking beams designated by legs 8a and 8b. These legs enclose the end edges of the electrode plates 7a which have longitudinally re-bent flanges 7b known in the art to form dust collecting pockets. Leg 8a has pre-formed bolt holes 11 aligned with the bolt hole axis for the countersunk depression 6 in leg 8b. Nut 4, when turned, bears against leg 8a and forces the pointed end 3 of bolt 1 through the electrode plate and through the aligned bolt hole in leg 8b. As shown on the right-hand side of FIGURE 3, the diameter of the bolt hole in leg 8b is greater than the diameter of the bolt 1. Nut 4 forces disc 2 into the countersunk depression 6, and in so doing, the peripheral edge of the hole punched in plate 7a extends into the bolt hole. A washer 12 is then placed over the end of bolt 1 and a nut 5 threaded on the end of the bolt. When nut 5 is drawn up, it stretches and tightly fastens the metal plate in the bolt hole. Simultaneously, nut 4 can be turned into locking engagement with the disc 2.

The feature of the invention in having the edges of the bore hole in the electrode plate seated in the countersunk depression in the supporting or knocking beam is not necessarily limited to the in-place punching of holes in the electrode plate. Metal plates that have pre-formed bore holes can also be similarly fastened. In such a case, it would not be necessary to employ, either in FIGURES 1 or 3, the point 3 on bolt 1, nor the nut 4. It would only be necessary to force the peripheral edge of the bolt hole in the thin electrode plate into the countersunk depression 6 by means of a conical disc 2, or a corresponding conically shaped base for the head of the bolt, and to pull the bolt up tightly by means of the nut 5.

Having now described the means by which the objects of the invention are obtained, I claim:

1. A method for securing a thin metal electrode precipitating plate to a beam in an electrical precipitator comprising forming a countersunk bore hole in said beam, covering said beam and hole with said plate, placing a conically shaped disc on a sharp pointed threaded bolt, puncturing said plate by said bolt and extending said bolt through said bore hole, and then tightening said bolt to force said disc against the periphery of the punctured opening in said plate and depress said periphery into tight engagement with said countersunk bore hole.

2. A device for joining a thin metal electrode precipitating plate to a beam having a countersunk bore hole therein comprising a sharp pointed threaded bolt, a conically shaped disc on said bolt, nut means for urging said bolt into puncturing engagement with said plate and through said bore hole, and second nut means for tightening said bolt and forcing said conically shaped member into engagement with the periphery of the punctured opening in said plate and depress said periphery into tight engagement with said countersunk hole.

3. A device as in claim 2, said conically shaped member being threaded to said bolt.

4. A device as in claim 2, said nut means for urging said bolt to puncture said plate comprising a U-shaped member having one leg contacting said beam, a second leg spaced from said plate, holes in each leg alignable with said bore hole in said beam, and a thrust nut threaded on said bolt between the two legs of said U-shaped member.

5. A device as in claim 2, said beam comprising a U-shaped member having aligned openings in the legs thereof, and said nut means for urging said bolt to puncture said plate comprising a thrust nut threaded on said bolt between the legs of said U-shaped member.

6. A device as in claim 2, said bore hole having a diameter greater than that of said bolt.

7. A method for securing a thin metal electrode precipitating plate to a knocking beam in an electrical precipitator comprising forming a countersunk bore hole in said beam, covering the countersunk side of said beam with the end portion of the precipitator plate, enclosing said beam and plate with a U-shaped member having a first leg engaging said beam and a second leg spaced from said first leg on the side of the beam opposite said first leg, each leg having a hole therein aligned with said countersunk bore hole in said beam, placing a pointed end bolt threaded with a nut in the hole of the second leg and carrying a conically shaped disc between said nut and the free end of said bolt, turning said nut relative to said bolt to cause said nut to bear against the inner surface of said second leg to force said bolt against said plate until the pointed end thereof punctures said plate and passes through said countersunk bore hole in said beam and the hole in said first leg, and then placing a second nut on the free end of said bolt and turning it to draw the conical side of said disc and the peripheral edge portion of the opening punched through said plate into said countersunk hole in said beam for immovably fastening said plate to said beam.

8. A method as in claim 7, further comprising forming said bore and holes with each having a diameter of at least a millimeter greater than the diameter of said bolt.

References Cited by the Examiner
UNITED STATES PATENTS

| | | | |
|---|---|---|---|
| 1,342,201 | 7/1920 | Beckwith. | |
| 2,391,761 | 12/1945 | Winn. | |
| 2,505,175 | 4/1950 | Davis | 55—491 |
| 2,643,721 | 6/1953 | Arbuckle. | |
| 2,740,192 | 4/1956 | Ogle | 29—432 |
| 2,815,791 | 12/1957 | Poska. | |
| 2,856,680 | 10/1958 | Johnson et al. | 29—432 |
| 2,928,450 | 3/1960 | Belding. | |
| 3,019,854 | 2/1962 | O'Bryant | 55—491 |
| 3,208,328 | 9/1965 | Meyers. | |

CHARLIE T. MOON, *Primary Examiner.*